US011165245B2

(12) United States Patent
Boesche et al.

(10) Patent No.: US 11,165,245 B2
(45) Date of Patent: Nov. 2, 2021

(54) OVERVOLTAGE PROTECTOR WITH ARRAY OF RESISTORS

(71) Applicant: Ellenberger & Poensgen GmbH, Altdorf (DE)

(72) Inventors: Dirk Boesche, Seershausen (DE); Ernst-Dieter Wilkening, Braunschweig (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 37 days.

(21) Appl. No.: 16/578,681

(22) Filed: Sep. 23, 2019

(65) Prior Publication Data

US 2020/0021108 A1 Jan. 16, 2020

Related U.S. Application Data

(63) Continuation of application No. PCT/EP2018/056912, filed on Mar. 19, 2018.

(30) Foreign Application Priority Data

Mar. 21, 2017 (DE) .................... 10 2017 204 695.3

(51) Int. Cl.
*H02H 9/04* (2006.01)
*H02H 9/00* (2006.01)

(52) U.S. Cl.
CPC ............. *H02H 9/04* (2013.01); *H02H 9/005* (2013.01); *H02H 9/041* (2013.01)

(58) Field of Classification Search
CPC .......... H02H 9/06; H02H 9/04; H02H 9/402; H02H 9/405; H02H 7/24; H02H 9/041;
(Continued)

(56) References Cited

U.S. PATENT DOCUMENTS 3,573,554 A * 4/1971 Theobald .............. H02H 3/202 361/90
4,334,256 A 6/1982 Mings
(Continued)

FOREIGN PATENT DOCUMENTS

CN 1528040 A 9/2004
CN 101203994 A 6/2008
(Continued)

OTHER PUBLICATIONS

Chinese Office Action dated Sep. 2, 2020 in corresponding application 201880004356.9.
(Continued)

*Primary Examiner* — Gustavo A Rosario-Benitez
(74) *Attorney, Agent, or Firm* — Muncy, Geissler, Olds & Lowe, P.C.

(57) ABSTRACT an overvoltage protector for protecting a device to be protected, having a first terminal and a second terminal. A number of strings are connected in parallel to one another between the first terminal and the second terminal, each string having a resistor, and at least one of the strings comprising a switching element that is connected in series to the resistor of the string. A circuit having an overvoltage protector, a use of an overvoltage protector, and a method for operating an overvoltage protector is also provided.

1 Claim, 3 Drawing Sheets

6
12
10
8
2
4
22
20
18
16
14

(58) Field of Classification Search
CPC .......... H02H 9/043; H02H 9/005; H02H 3/06; H02H 9/00; H02H 3/025; H02H 7/222; H02H 9/042; H02H 3/0935; H02H 3/05; H01C 7/12; H01C 8/04; H01G 9/18
See application file for complete search history.

(56) References Cited

U.S. PATENT DOCUMENTS 4,442,472 A * 4/1984 Pang .................... H02H 3/0935 361/95
4,758,919 A * 7/1988 Stewart .................... H02H 3/06 361/114
5,023,527 A * 6/1991 Erdman .................. F23N 3/082 318/400.34
5,138,513 A * 8/1992 Weinstein ............. H02H 7/003 361/2
5,166,887 A * 11/1992 Farrington ............... H02H 3/04 700/293
6,635,930 B1 10/2003 Hauptmann et al.
6,687,103 B2 2/2004 Pannwitz
6,738,245 B2 * 5/2004 Ely ........................ H02H 7/067 361/91.1
7,268,992 B2 9/2007 Hallak et al.
7,453,680 B2 11/2008 Hallak et al.
7,786,870 B2 8/2010 Zettler
8,000,072 B2 8/2011 Bauer et al.
9,373,473 B2 7/2016 Dupraz et al.
10,298,251 B2 * 5/2019 Llling ................... H03M 1/124
2009/0147423 A1 * 6/2009 Mulligan .............. H02J 7/0029 361/91.1
2016/0172846 A1 6/2016 Kotani et al.
2018/0323699 A1 * 11/2018 Carpenter, Jr. ........ G05B 15/02
2019/0199082 A1 6/2019 Boesche et al.

FOREIGN PATENT DOCUMENTS

| | | | |
|---|---|---|---|
| CN | 109661756 | A | 4/2019 |
| DE | 198 11 269 | C1 | 10/1999 |
| JP | 2003079060 | A | 3/2003 |
| JP | 2008136296 | A | 6/2008 |
| JP | 2008541288 | A | 11/2008 |
| JP | 4346860 | B2 | 10/2009 |
| JP | 2015507325 | A | 3/2015 |
| WO | WO 98/45919 | A1 | 10/1998 |
| WO | WO 00/19573 | A1 | 4/2000 |
| WO | WO 2018/041452 | A1 | 3/2018 |

OTHER PUBLICATIONS

Japanese Office Action dated Nov. 10, 2020 in corresponding application JP 2019-534228.

* cited by examiner

O
DIS
THR
U+
TR
R
CV
GND
Q0
Q1
Q2
Q3
Q4
Q5
Q6
Q7
Q8
Q9
CO
CLK
ENA
RES

OVERVOLTAGE PROTECTOR WITH ARRAY OF RESISTORS

This nonprovisional application is a continuation of International Application No. PCT/EP2018/056912, which was filed on Mar. 19, 2018, and which claims priority to German Patent Application No. 10 2017 204 695.3, which was filed in Germany on Mar. 21, 2017, and which are both herein incorporated by reference.

BACKGROUND OF THE INVENTION

Field of the Invention

The present invention relates to an overvoltage protector for protecting a device to be protected, comprising a first terminal and a second terminal, as well as to a circuit having a device to be protected and having an overvoltage protector. The invention further relates to the use of an overvoltage protector and to a method for operating an overvoltage protector.

Description of the Background Art

Electrical devices usually have a rated electrical voltage at which they are operated. If this rated voltage is significantly exceeded, damage to the electrical device is possible. Exceeding the rated voltage occurs, for example, due to a technical defect in the electrical device or any other part of the circuit, the electrical device being a component of said circuit. Fuses or circuit breakers are usually used to protect the electrical device against such electrical voltages.

It is necessary further that electrical devices are protected against an overvoltage, which arises, for example, due to a lightning strike in a line of the circuit or the electrical device itself. It is also possible that such an overvoltage arises within the circuit due to an inductive coupling of a component of the circuit with lightning. In addition, such overvoltages, which can lead to damage to the device, can occur due to electromagnetic pulses (EMP) or due to electrostatic discharges (ESD) and switching operations in the circuit. Such overvoltages exceed the rated voltage to a comparatively large extent. The overvoltages also arise due to external events and therefore cannot be influenced by the electrical device and for this reason cannot be avoided To protect the electrical device against overvoltages, an overvoltage protector is used, which is connected in parallel to the device to be protected. The overvoltage protector itself has, for example, a spark gap or a varistor. In this case, the overvoltage is conducted around the device to be protected, for example, with an arc being generated. The spark gap and the varistor are subject to aging effects, so that after a certain period of time the electrical voltage varies, starting from which the overvoltage protector responds. Arising overvoltages also lead to wear of the overvoltage protector. As a result, it is not ensured that all overvoltages that could damage the device will always be absorbed by the overvoltage protector. Thus, the overvoltage protector must be replaced after certain periods of time to ensure proper operation.

SUMMARY OF THE INVENTION

It is therefore an object of the present invention to provide an overvoltage protector and a particularly suitable circuit, as well as a use of an overvoltage protector and a method for operating an overvoltage protector, wherein in particular safety is increased and preferably manufacturing and/or operating costs are reduced.

The overvoltage protector is used to protect a device to be protected, in particular the electrical fuse. In other words, an overvoltage at the device to be protected or a pulse current flowing through the device to be protected is prevented by means of the overvoltage protector. The overvoltage protector is expediently suitable, provided, and/or set up for this purpose. The overvoltage/pulse current is generated independently of the overvoltage protector and the device to be protected, in particular by an external event such as a lightning strike. The overvoltage/pulse current is in particular such that it would damage the device to be protected, and the electrical voltage applied to the device to be protected is expediently limited by the overvoltage protector. Preferably, the overvoltage protector acts as an arrester and is, for example, an overvoltage and/or lightning arrester.

The overvoltage is, for example, an AC voltage or a DC voltage, and/or the pulse/lightning current is a direct current or an alternating current. For example, the overvoltage has a frequency greater than 500 Hz, 800 Hz, or 900 Hz. Conveniently, the frequency is greater than or equal to 1 kHz, 1.5 kHz, 2 kHz, 5 kHz, or 10 kHz. In particular, the frequency is less than or equal to 10 MHz, 5 MHz, or 1 MHz. In particular, the overvoltage protector is suitable, preferably provided, and set up to carry a rated current greater than or equal to 100 A, 300 A, 500 A, 800 A, 2 kA, 3 kA, 5 kA, 10 kA, 12 kA, 17 kA, 20 kA, 22 kA, 25 kA, or 30 kA. A conductible current is understood, in particular, to be the electric current that can be conducted by means of the overvoltage protector, without causing any damage thereby.

For example, the overvoltage protector is suitable, in particular provided, and set up, to protect against an overvoltage that is greater than or equal to 100 V, 200 V, 300 V, 400 V, or 500 V. For example, the maximum overvoltage is 1100 V, 1000 V, 900 V, or 800 V, especially if the electric current is an alternating current. If the electric current is a direct current, the maximum overvoltage is suitably less than or equal to 2000 V, 1800 V, 1500 V, 1200 V, or 1000 V.

For example, an outdoor unit, therefore, a device that is used in outdoor operation, is secured by means of the overvoltage protector. In particular, the device is stationary. For example, the device is a transponder, such as a mobile radio transponder. Such mobile radio transponders are usually placed at exposed positions and are therefore subject to the risk of a lightning strike or at least the risk of exposure to an overvoltage due to a lightning strike.

The overvoltage protector has a first terminal and a second terminal, each of which in the assembled state is electrically contacted with the device to be protected. In the case of an overvoltage (overvoltage event), the overvoltage is present between the first terminal and the second terminal. A number of strings are connected in parallel to one another between the first terminal and the second terminal. In other words, the strings are connected in parallel to one another and are in each case electrically contacted with the first terminal and the second terminal. In other words, the two terminals are electrically contacted by means of the strings and the device to be protected is preferably bridged by means of the strings.

Each string has a resistor and at least one of the strings comprises a switching element connected in series to the resistor of the string. In other words, this string has the resistor and the switching element, wherein the switching element and the resistor are connected in series. This series connection is connected in the assembled state, in particular in parallel to the device to be protected. The resistors of the strings are expediently ohmic resistors and preferably have a resistance of at least 1 mohm, 5 mohms, 10 mohm, 50 mohms, 100 mohms, 500 mohms, 1 ohm, 2 ohms, 5 ohms, 10 ohms, 20 ohms, 50 ohms, 100 ohms, 200 ohms, 500 ohms, 1 kohm, 2 kohms, 5 kohms, or 10 kohms. The resistance is preferably less than or equal to 1 kohm, 500 ohms, or 100 ohms. Preferably, the overvoltage protector comprises 2 strings, 3 strings, or 5 strings. In particular, the number of strings is greater than or equal to 2 strings, 3 strings, or 4 strings. For example, the number of strings is less than or equal to 20 strings or 10 strings.

The electrical voltage arising between the two terminals is limited by the strings. In this case, the electrical voltage is preferably limited such that damage to the device to be protected is prevented. As a result, safety is increased. The overvoltage protector can also be realized by a relatively small number of cost-effective electrical components, which reduces manufacturing costs. These are also subject to relatively low aging effects, so that the overvoltage protector ensures reliable protection against a certain overvoltage over a relatively long period of time. It is possible by means of the switching element to suppress a current flow in the string having the switching element and consequently to adjust the electrical resistance of the overvoltage protector. As a result, the voltage across the device to be protected can be adjusted and limited by means of the overvoltage protector, which increases safety. The overvoltage protector can also be used for different requirements.

The switching element can be actuated as a function of the overvoltage and/or of a pulse/lightning current. Suitably, the switching element is shifted to an electrically conductive state, when the overvoltage or the pulse/lightning current is detected, or these occur/are applied. In summary, the electrical resistance of the overvoltage protector can be adjusted by means of the switching element, so that an electrical voltage that arises across the overvoltage protector and thus between the two terminals can be adjusted. In this case, scalability of the overvoltage protector is provided by the number of strings and by the selection of the respective resistor, so that it can be adapted to a wide variety of electrical voltages and/or electric currents. Consequently, a field of application of the overvoltage protector is increased.

The switching element can be a semiconductor switching element, for example, a transistor, such as a field-effect transistor, in particular a MOSFET. For example, the switching element is a field-effect transistor, a junction gate field-effect transistor (JFET), or a MOSFET. Because the overvoltage is divided among the strings, a reduced electrical voltage is present at the switching element, which is why a relatively inexpensive switching element can be used.

Expediently, each string can have a switching element of this kind. Here, the switching elements of the strings are structurally identical, for example. Alternatively or in combination therewith, the switching elements are adapted to the resistance of the particular string. In summary, each string has both the resistor and the switching element, which are connected in series to each other. Due to the switching elements, a scalability of the overvoltage protector is thus increased, so that the electrical resistance of the overvoltage protector and consequently the electrical voltage arising between the two terminals can be adjusted by the switching elements. In particular, the strings are structurally identical. In other words, all resistors have the same ohmic resistance, and all switching elements are of the same type. At least, however, the strings are the same in terms of circuitry. In other words, each string comprises the same type of electrical and/or electronic components, but the respective specifications may be different. The electrical and/or electronic components in this case are interconnected in the same way. Suitably, the ohmic resistance of the individual resistors of the strings is different. If the overvoltage protector has a number of strings, in this case the ohmic resistance values are preferably increased by a specific constant multiple in each case. The multiple is in particular an integer multiple and, for example, two or three. Suitably, each string thus has an ohmic resistance of 20 ohms, 40 ohms, 80 ohms, . . . or 20 ohms, 60 ohms, 180 ohms, . . . , provided the smallest resistor in each case has an ohmic resistance of 20 ohms. In this way, a relatively precise adjustment of the electrical voltage arising between the two terminals is possible. In addition, manufacturing costs are reduced due to the use of identical parts.

Each switching element can have a control input, by means of which a switch position of the switching element can be influenced. In other words, the switching state of the switching element is influenced by driving the control input, and it is consequently shifted to a conductive or an electrically non-conductive state. The switching element is expediently electrically conductive if a signal is applied at the control input, therefore, if it is driven. The control input of each switching element is connected to an output of an OR logic switch, in particular directly. In other words, the control input of this switching element is contacted electrically directly or by signals with the output of the respective OR logic switch.

Each OR logic switch further has a first input, which is run to the first terminal, therefore, is connected to the first terminal. In this case, the first input is connected, for example, directly or via a further electrical and/or electronic component to the first terminal, in particular via a trigger circuit. Suitably, the first input is at a level when the overvoltage is present between the first terminal and the second terminal. In other words, the first input is connected to the first terminal such that it has the level when the overvoltage is applied between the first terminal and the second terminal. For this purpose, the first input is, for example, additionally connected to the second terminal, in particular indirectly.

The OR logic switch can be connected via a detection circuit to the first terminal, wherein the detection circuit is formed and/or adjusted such that when the overvoltage occurs, the first input has the level. Thus, the switching elements are shifted to an electrically conductive state, if the overvoltage is present. As a result, all strings carry current, and the electrical voltage present between the terminals is limited due to the parallel connection of the strings, which are electrically conductive. Thus, the device to be protected, which is connected in parallel to the strings, is protected from overvoltage.

The overvoltage protector can have a shift register which has a number of outputs, wherein the number of outputs is expediently equal to the number of switching elements. During operation of the shift register, the outputs are expediently driven successively, wherein in particular always at most one of the outputs is driven at any time. A second input of each OR logic switch is connected to one of the outputs of the shift register, in particular directly. If a level is present at one of the inputs of the particular OR logic switch, a level is preferably also applied to the output of the particular OR logic switch. Consequently, the OR logic switch is active if an active signal is applied to one of its two inputs. Only if there is no active signal (level) at either the first or second input is the output of the OR logic switch also not active. The OR logic switches are in particular structurally identical and preferably OR gates.

When the output signal is pushed from one of the outputs (first output) to another of the outputs (second output) by means of the shift register, in particular the switching element whose control input is contacted with the first output is shifted to the electrically non-conductive state. In contrast, the switching element whose control input is contacted with the second output preferably remains in an electrically conductive state or is shifted to the electrically conductive state. As a result, the electrical resistance of the overvoltage protector is increased.

Thus, the switching elements are activated when either the overvoltage is present or the respectively associated OR logic switch is driven by the shift register. In particular, all switching elements are closed as soon as the overvoltage prevails. Following this, the shift register is expediently activated, and the switching elements are successively actuated. In this case, the overvoltage expediently no longer lies between the two terminals, so that the switching elements are driven by means of the driving of the shift register. In other words, a level is no longer applied to the first input of each OR logic switch, and the switching element is driven only via the second input.

In summary, the shift register has a number of outputs, each of which is connected to an OR logic switch and which are suitably numbered. The first output of the shift register corresponds in particular to a channel 1, and the second output corresponds in particular to a channel 2. Particularly preferably, a start output of the shift register is free. The start output corresponds in particular to a channel 0 and is located before the first output. In particular, the first output is located between the start output and the second output. The start output is not occupied and no electrical or electronic component is connected to it. Consequently, the start output is electrically loose and no further or electronic component is electrically contacted with it. Consequently, in the normal state, the switching elements are in the electrically non-conductive state, and the electrical resistance of the overvoltage protector is relatively large. Therefore, in case of malfunction of the shift register or other components of the voltage register, an unwanted electric current flow across the overvoltage protector is substantially excluded, even if the electrical voltage arising between the terminals is relatively high. When the shift register is activated, the start output is preferably driven. The driving of the start output is terminated and the driving of the first output is started only when the shift register receives a signal, so that then a level (signal) is applied to one of the OR logic switches.

The shift register expediently comprises a reset input. The shift register is brought into a defined state by a driving of the reset input. In particular, the start output of the shift register is activated if a signal is present at the reset input. Expediently, a final output of the shift register is connected to the reset input. In particular, the final output of the shift register is the output of the shift register that is located directly next to an output of the shift register that is connected to one of the OR logic switches. If therefore only the first or second input of the OR logic switch is occupied, therefore, if only two switching elements are driven by the shift register, the final output corresponds to the third output. Consequently, if the number of driven switching elements has been successively reduced, the final output of the shift register is driven, and the shift register is consequently again shifted to the original state. In this case, the start output of the shift register is expediently free, so that it is driven after the final output in terms of time. Thus, if the final output is driven, none of the switching elements are driven, which is why none of the strings are electrically conductive. Expediently, a diode is connected between the final output and the reset input, which avoids damage to the shift register. In summary, the final output is the last occupied channel of the shift register.

A voltage supply source can be connected to the reset input of the shift register, for example, via a capacitor. The voltage supply source is suitably used for the operation of the overvoltage protector. The voltage supply source itself is, for example, a capacitor, a battery, or a transformer. For example, the voltage supply source is connected to at least one of the terminals, so that the electrical energy required for operating the overvoltage protector is taken directly from a power grid into which the device to be protected is integrated.

The shift register can comprise a time input. When the time input of the shift register is driven, the outputs of the shift register are successively turned on. In this case, each time when a signal is present at the time input, the driving of the outputs is changed such that they are advanced by an output. Expediently, the time input of the shift register is connected to an output of a further OR logic switch, in particular directly. The further OR logic switch preferably has a first input and a second input. Thus, when a level is applied to the first input or the second input, in particular the driving of the outputs of the shift register is changed. In particular, the level denotes a signal which is different from zero (0).

The overvoltage protector can comprise a timer with a time output. The time output is operatively connected to the time input of the shift register. Consequently, the shift register is driven by means of the timer, wherein preferably a specific clock signal, which in particular has a constant period, or which preferably depends on the currently applied overvoltage, is provided by the timer. For example, the time output is directly connected to the time input of the shift register. The time output is suitably connected to the second input of the further OR logic switch, in particular directly, if it is present. A trigger signal is expediently provided periodically at the time output of the timer.

The first input of each OR logic switch can be connected to the first input of the further OR logic switch, in particular directly. In other words, the first input of the further OR logic switch is operatively connected to the first terminal. Thus, suitably, the output of the further OR logic switch has a level when the overvoltage occurs or when a signal is provided by the timer.

The control input of one of the switching elements can be connected to a reset terminal of the timer. As long as a signal is applied to the reset terminal of the timer, it is kept in particular in a ground or start state. Expediently, the connection is such that a reset occurs when the switching element is open. Thus, the shift register is only incremented when the switching element, or at least one of the switching elements, is in a closed state. Suitably, the connection of the overvoltage protector is such that after the overvoltage is detected, all switching elements are shifted to the electrically conductive state, and that the timer is activated. In this case, the OR logic switches are suitably activated successively by the shift register, so that the switching elements are transferred to the electrically non-conductive state. As soon as the last electrically conductive switching element is transferred to the electrically non-conductive state, the timer is expediently reset.

For example, the timer is an NE555. Suitably, "OUT" is the time output, which is connected, for example, to the logic switch or directly to the time input of the shift register directly or indirectly via the further OR logic switch. In particular, "OUT" is connected by means of a diode to "TRIG" (trigger terminal), which is connected in particular by means of a resistive divider to the first terminal, which in operation preferably has an electrical potential different from zero (0). For example, "GND" (GND terminal) is connected to the second terminal of the overvoltage protector. For example, "RESET" (reset terminal) is operatively connected to the control input of one of the switching elements, for example, connected directly thereto. Expediently, the NE555 is implemented as a monostable multivibrator.

At least one of the OR logic switches has a third input, wherein a level is expediently applied at the output of the OR logic switch exactly when a level is applied to at least one of the three inputs. In particular, all OR logic switches have the third input. In this case, for example, the third input in one of the OR logic switches is connected to ground. The third input of at least one of the OR logic switches is connected to an output of one of the other OR logic switches, in particular directly. Preferably, in this case the third input is connected to the control input of one of the switching elements, which is also connected to the output of the other OR logic switch. Suitably, with the exception of one of the OR logic switches, all third inputs are connected in each case to one output of a further OR logic switch, and each output of the OR logic switches is thus associated with one of the third inputs of the OR logic switches.

If one of the OR logic switches is thus activated by the shift register, this OR logic switch and another OR logic switch are activated via its output. Thus, at least two of the switching elements are activated and switched to be electrically conductive, which is why at least two of the strings of the overvoltage protector are electrically conductive. In particular, the interconnection is such that when one of the OR logic switches is driven, all the switching elements are shifted to the electrically conductive state. This OR logic switch is preferably connected to the first output of the shift register. Thus, all switching elements are expediently driven when the first output of the shift register is driven. As soon as the subsequent output of the shift register is driven, preferably only one of the switching elements is transferred to the electrically non-conductive state, so that the number of electrically conductive strings of the overvoltage protector is reduced by exactly one (1). Upon renewed driving of the shift register and driving of a further output of the shift register, due to the interconnection of the OR logic switches appropriately only one switching element is again transferred additionally to the electrically non-conductive state, so that another string of the overvoltage protector is electrically non-conductive. As a result, it is possible to increase successively and stepwise the electrical resistance of the overvoltage protector by driving the shift register.

A series connection of a further resistor and a capacitor is connected in parallel to the switching element. If the overvoltage protector has a number of such circuit elements whose control input is connected in each case via an OR logic switch to an output of any possible shift register, the series connection is preferably connected in parallel to the switching element that is connected to the output of the shift register adjacent to the final output. The capacitance is preferably a capacitor. If the switching element is in the electrically non-conductive state, an RC circuit, which takes up any further flowing electric current, is formed by the resistor of this string and the further resistor and the capacitor. Thus, an electric current flow across the overvoltage protector is always possible, even if the electrical resistance is relatively high. Expediently, the further resistance is relatively high, so that the electric current is taken to zero (0). Due to the strings of the overvoltage protector, the flowing electric current is relatively small, so that the capacitor can be dimensioned relatively small, which reduces manufacturing costs. Suitably, an additional resistor is connected in parallel to the capacitor. The additional resistor ensures that the capacitor is always discharged.

The overvoltage protector can be based on analog technology. In other words, the overvoltage protector is created using analog technology. If the overvoltage protector consequently has the OR logic switches, the timer, the further OR logic switch, and/or the shift register, these are based in particular on analog technology and are manufactured using this technology. Robustness is increased in this way. In addition, manufacturing costs are reduced.

The circuit has a device to be protected to which an overvoltage protector is connected in parallel. The device to be protected can be an outdoor device, such as a transponder. In particular, the device to be protected is intended for radio communication and is, for example, a mobile radio transponder. The overvoltage protector has a first terminal and a second terminal, between which a number of strings are connected in parallel to one another, wherein each string has a resistor, and wherein at least one of the strings comprises a switching element connected in series to the resistor of the string. The device to be protected is electrically contacted both with the first terminal and with the second terminal of the overvoltage protector. The circuit is, for example, integrated within a housing or has a housing, so that the device and the overvoltage protector are protected by the common housing from mechanical influences. Alternatively, the device to be protected and the overvoltage protector each comprise a separate housing, which, for example, are fastened to one another for mounting.

An overvoltage protector is used to protect a device to be protected against overvoltage and/or a pulse current, said protector which has a first terminal and a second terminal, between which a number of strings are connected to one another in parallel, wherein each string has a resistor, and wherein at least one of the strings comprises a switching element, connected in series to the resistor of the string. In this case, in particular due to a lightning strike, the overvoltage occurs between the first and second terminal of the overvoltage protector. The lightning strike takes place in this case, for example, in a line directly electrically contacted with the first terminal or with the second terminal, or the overvoltage occurs due to a coupling of a magnetic field, produced by the lightning strike, with the line.

The method is used to operate an overvoltage protector to protect a device to be protected, having a first terminal and a second terminal, between which a number of strings are connected in parallel to one another. Each string has a resistor, and at least one of the strings comprises a switching element connected in series to the resistor of the string. The method provides for an overvoltage to be detected. The overvoltage is an electrical voltage and is applied, for example, between the first terminal and the second terminal. The overvoltage is in this case in particular such that a device to be protected by means of the overvoltage protector would be damaged due to the overvoltage. The overvoltage occurs, for example, due to a pulse current and/or an inductive effect. Alternatively or in combination therewith, the overvoltage occurs due to a lightning strike. The overvoltage is detected, for example, by an external device, a sensor, or intrinsically by the overvoltage protector itself. The detection of the overvoltage occurs suitably qualitatively or quantitatively. After the overvoltage is detected, the switching element is closed for a period of time. Suitably, the switching element is closed substantially immediately after detection or upon detection of the overvoltage.

Thus, when the overvoltage occurs, the electric current at least partially commutates to the overvoltage protector, namely to the strings. Due to the parallel connection of the resistors, the electrical resistance of the overvoltage protector is reduced. After the period of time has elapsed, which is determined in particular as a function of the currently applied overvoltage, the switching element is opened, which leads to an increase in the electrical resistance of the overvoltage protector. If the overvoltage protector has a number of strings with switching elements, the method provides that these are successively opened, wherein all switching elements are expediently closed initially when the overvoltage is detected. Suitably, there is a or the period of time between the actuation of the individual switching elements, so that the electrical resistance of the overvoltage protector is successively increased.

If a device, which is connected in parallel to the overvoltage protector, is upstream of a pulse current and/or an overvoltage by means of the overvoltage protector, the electrical voltage arising across the device is limited. After the period of time has elapsed, the flowing electric current is reduced due to the electrical resistance of the overvoltage protector. Now, when the switching element is actuated, the electrical resistance and consequently the electrical voltage increase again. This results to a further and marked reduction of the electric current flow. Thus, by increasing the electrical resistance the electric current flow is successively prevented, wherein the maximum voltage applied is reduced. If the capacitor and the further resistor are connected in parallel to the switching element, any remaining electric current flow is absorbed and taken to zero by this series connection after actuation of the switching element.

If individual components are referred to as the first, second, third, . . . , component, this is used in particular only to designate the particular component. In particular, this does not imply the presence of a specific number of components. The advantages and refinements mentioned in connection with the overvoltage protector and/or the circuit are also to be applied analogously to the use and the method and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
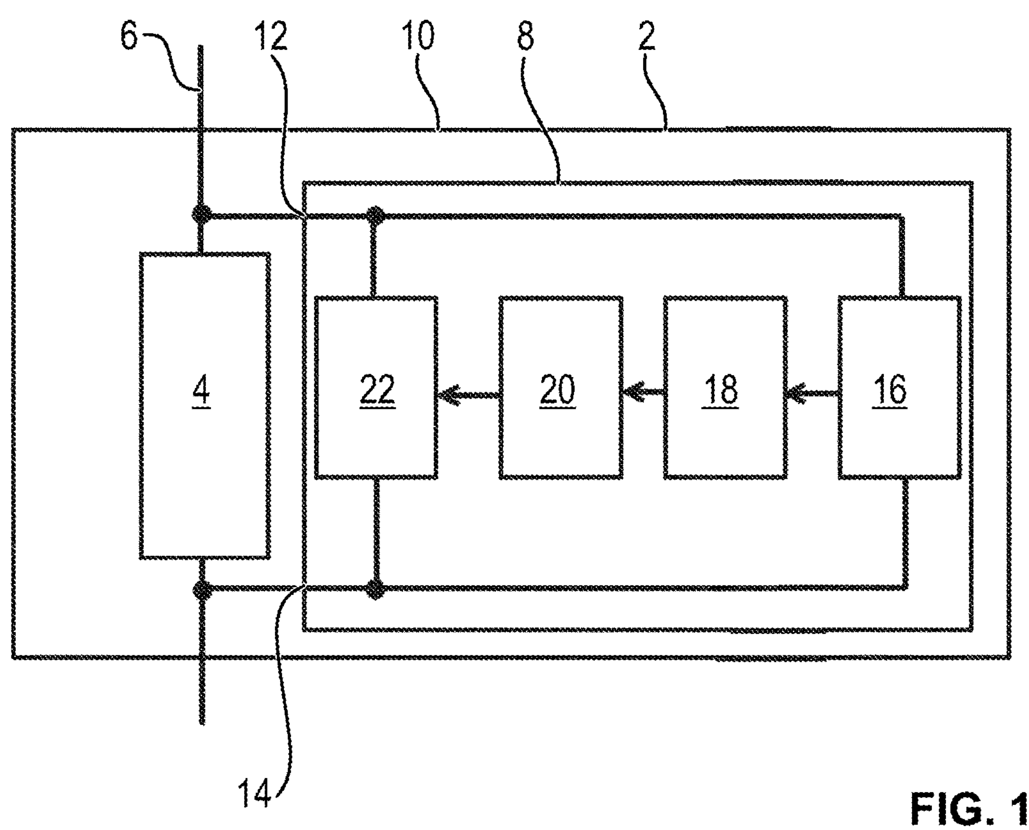
FIG. 1 shows schematically simplified a circuit with a device to be protected and an overvoltage protector.

FIG. 1 shows schematically simplified a circuit 2 with a device 4 to be protected, which is inserted into an electrical line 6. Electrical line 6 is electrically contacted with device 4 to be protected, which is a mobile radio transponder. Further, circuit 2 comprises an overvoltage protector 8, which is connected in parallel to device 4 to be protected. Device 4 to be protected and overvoltage protector 8 are disposed within a housing 10.

Overvoltage protector 8 has a first terminal 12 and a second terminal 14, which are electrically contacted directly with electrical line 6, wherein device 4 to be protected is located between the two terminals 12, 14. In addition, overvoltage protector 8 has a detection circuit 16, by means of which an overvoltage can be detected, which is applied between the two terminals 12, 14, for example, due to a lightning strike. In addition, overvoltage protector 8 comprises a timer 18 and a shift register 20. Timer 18 is an NE555 component. In addition, overvoltage protector 8 has a number of strings 22 which are connected in parallel to one another and are in each case electrically contacted with first terminal 12 and second terminal 14. Thus, strings 22 are connected in parallel to device 4 to be protected.

The overvoltage, if it occurs, applied between first terminal 12 and second terminal 14 is detected by detection circuit 16. As a result, timer 18, which is an NE555 component, is driven. Shift register 20 is driven by it and thus supplied with certain clocks by timer 18. Strings 22 are controlled by shift register 20. Overvoltage protector 8 is based on analog technology. In other words, strings 22 and timer 18 as well as shift register 20 and detection circuit 16 are designed as analog components and thus is formed of analog components.

Figure 2:
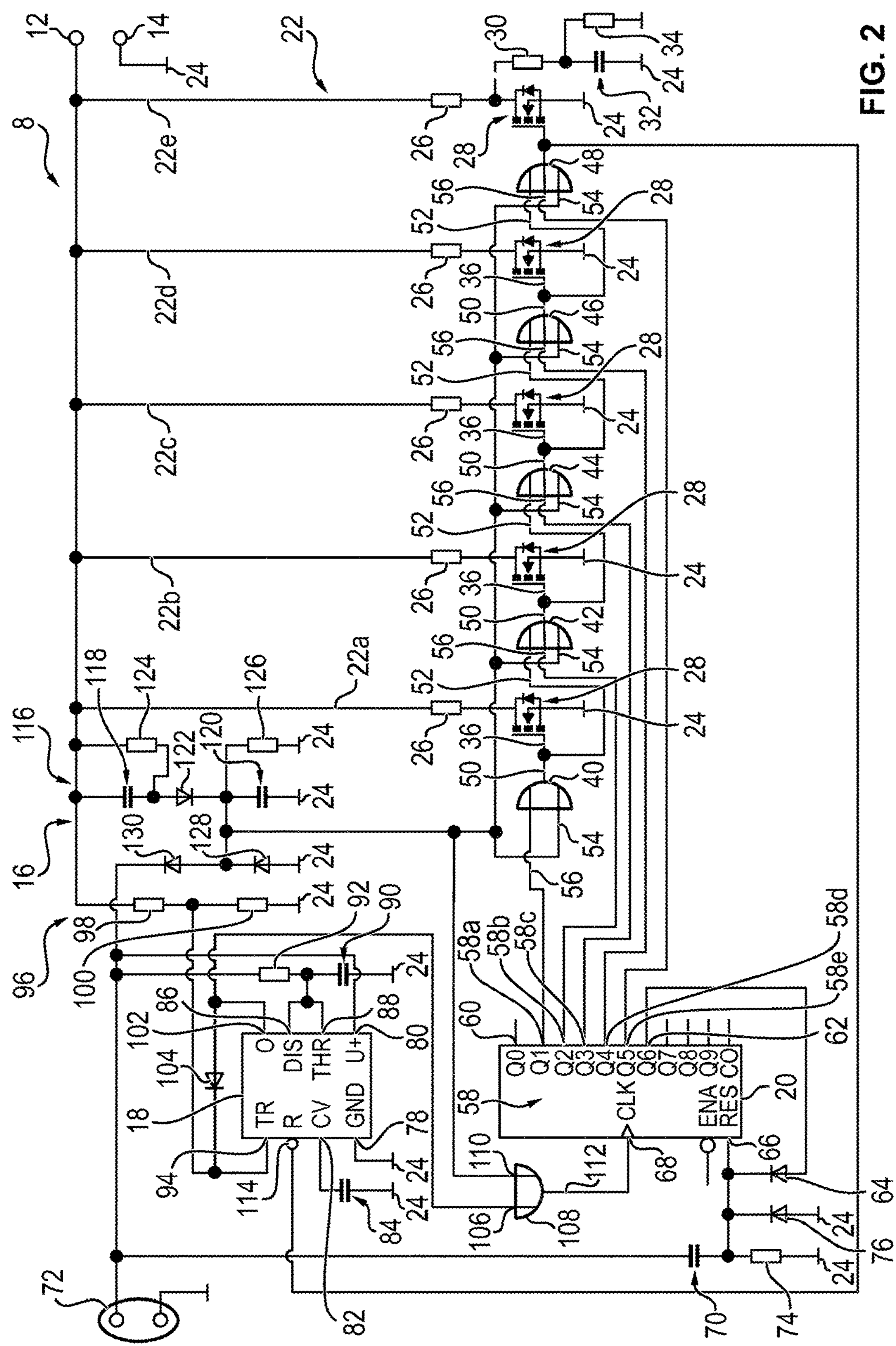
FIG. 2 shows a circuit diagram of the overvoltage protector.

FIG. 2 shows a relatively detailed circuit diagram of overvoltage protector 8 with strings 22. Overvoltage protector 8 has a first string 22*a*, a second string 22*b*, a third string 22*c*, a fourth string 22*d*, and a fifth string 22*e*, which are connected in parallel to one another and are taken to first terminal 12 and ground 24, to which second terminal 14 is also connected. Thus, strings 22 between first terminal 12 and second terminal 16 are connected in parallel to one another. Strings 22 are structurally identical and each have a resistor 26 and a switching element 28 in the form of an IGBT. In summary, each string 22 in each case has one of switching elements 28. Resistor 26 and switching element 28 of each string 22 are connected in series to one another. The ohmic resistance of the individual strings 22*a*, 22*b*, 22*c*, 22*d*, 22*e* is at least partially increased by an integer multiple. The ohmic resistance of resistor 26 of first string 22*a* is 20 ohms, the ohmic resistance of resistor 26 of second string 22*b* is 40 ohms, the ohmic resistance of resistor 26 of third string 22*c* is 80 ohms, and the ohmic resistance of resistor 26 of fourth and fifth strings 22*d*, 22*e* is 160 ohms in each case.

A series connection of a further resistor 30 and a capacitance 32 in the form of a capacitor is connected in parallel to switching element 28 of fifth string 22*e*. In this case, capacitor 32 is connected to the potential of second terminal 14, therefore, to ground 24. Capacitor 32 itself is bridged by means of an additional resistor 34, which is thus connected in parallel to capacitor 32. The ohmic resistance of further resistor 30 is equal to the ohmic resistance of resistor 26 of fifth string 22*e* and is 160 ohms. The ohmic resistance of additional resistor 34 is, for example, 1 Mohm.

Each switching element 28 has a control input 36, by means of which the switching state of the respective switching element 28 can be adjusted. If switching element 28 is adjusted by control input 36 such that it is in an electrically non-conductive state, a flow of current across just this string 22 is prevented. Overvoltage protector 8 has a first OR logic switch 40, a second OR logic switch 42, a third OR logic switch 44, a fourth OR logic switch 46, and a fifth OR logic switch 48, each of which is an OR gate. Control input 36 of switching element 28 of first string 22*a* is connected to an output 50 of first OR logic switch 40. Control input 36 of switching element 28 of second string 22*b* is connected to output 50 of second OR logic switch 42. Control input 36 of switching element 28 of third string 22*c* is connected to output 50 of third OR logic switch 44. Control input 36 of switching element 28 of fourth string 22*d* is connected to output 50 of fourth OR logic switch 46. Control input 36 of switching element 28 of fifth string 22*e* is connected to output 50 of fifth OR logic switch 48.

Output 50 of first OR logic switch 40 is connected to a third input 52 of second OR logic switch 42. Output 50 of second OR logic switch 42 is connected to third input 52 of third OR logic switch 44, whose output 50 is connected to third input 52 of fourth OR logic switch 46. Output 50 of fourth OR logic switch 46 is connected to third input 52 of fifth OR logic switch 48. Thus, third inputs 52 of OR logic switches 42, 44, 46, 48 are also each contacted with a control input 36 of one of switching elements 28. Each of the OR logic switches 40, 42, 44, 46, 48 also has a first input 54 which is connected to first terminal 12 via detection circuit 16 functioning as a drive circuit. Also, each of the OR logic switches 40, 42, 44, 46, 48 has a second input 56, which in each case is connected to an output 58 of shift register 20. Thus, second input 56 of first OR logic switch 40 is connected to a first output 58*a* of shift register 20, second input 52 of second OR logic switch 42 to a second output 58*b* of shift register 20, second input 52 of third OR logic switch 44 to a third output 58*c* of shift register 20, second input 52 of fourth OR logic switch 46 to a fourth output 58*d* of shift register 20, and second input 52 of fifth OR logic switch 48 to a fifth output 58*e* of shift register 20.

The OR logic switches 40, 42, 44, 46, and 48 are structurally identical, wherein third input 52 of first OR logic switch 40 is taken to ground 24. A level is present at the respective output 50 of OR logic switches 40, 42, 44, 46, 48, when a level is present at at least one of inputs 52, 54, 56.

In addition, shift register 20 has a start output 60 and a final output 62. Start output 60 of shift register 20 is free and thus electrically contacted with no further electrical or electronic component. A final output 62 of shift register 20 is connected via a first diode 64 to a reset input 66 of shift register 20. In this case, only a current flow from final output 62 to reset input 66 is made possible by means of diode 64. If shift register 20 is activated, start output 60 is initially driven. Following this, first output 58*a*, second output 58*b*, third output 58*c*, fourth output 58*d*, fifth output 58*e*, and subsequently final output 62 are driven, wherein the driving occurs depending on a drive signal applied to a time input 68 of shift register 20. Start output 60 thus corresponds to the channel Q0, first output 58*a* to the channel Q1, second output 58*b* to the channel Q2 . . . up to final output 62 corresponding to the channel Q6.

Reset input 66 of shift register 20 is connected via a second capacitor 70 to a voltage supply source 72, by means of which a DC voltage of 15 volts is provided. Also, reset input 66 is taken via a second resistor 74 to ground 24. Second resistor 74 is connected in parallel to a second diode 76, by means of which a current flow from ground 24 to reset input 66 is made possible.

Timer 18 is connected as a monostable multivibrator. Thus, a GND terminal 78 of timer 18 is taken to ground 24 and a supply voltage terminal 80 of timer 18 to voltage supply source 72. A control terminal 82 of timer 18 is taken via a third capacitor 84 to ground 24. A discharge terminal 86 of timer 18 is connected to a threshold terminal 88 of timer 18 and via a fourth capacitor 90 to ground 24. Discharge terminal 86 and threshold terminal 88 are also connected by a third resistor 92 to voltage supply power source 72. A trigger terminal 94 of timer 18 is electrically contacted with first terminal 12 and with the electrical potential of second terminal 16 by means of a voltage divider 96 of detection circuit 16. For this purpose, trigger terminal 94 is connected by means of a fourth resistor 98 to first terminal 12 and by means of a fifth resistor 100 to ground 24.

A time output 102 of timer 18 is connected to trigger terminal 94 by means of a third diode 104, wherein a current flow from time output 102 to trigger terminal 94 is made possible. Time output 102 is connected further to a second input 106 of a further OR logic switch 108, which is structurally identical to first OR logic switch 40. A first input 110 of the further OR logic switch 108 is connected to first input 54 of first OR logic switch 40, to first input 54 of second OR logic switch 42, to first input 54 of third OR logic switch 44, to first input 54 of fourth OR logic switch 46, and to first input 54 of fifth OR logic switch 48. An output 112 of the further OR logic switch 108 is connected to time input 68 of shift register 20. Furthermore, timer 18 has a reset input 114, which is connected to control input 36 of switching element 28 of fifth string 22*e* such that timer 18 is reset if switching element 28 of fifth string 22*e* is in the electrically non-conductive state.

Detection circuit 16 has a capacitive voltage divider 116 having a fifth capacitor 118 and a sixth capacitor 120, connected in series between first terminal 12 and ground 24. A fourth diode 122 is arranged in series between fifth capacitor 118 and sixth capacitor 120, and fifth capacitor 118 is bridged by a sixth resistor 124 and sixth capacitor 120 by a seventh resistor 126. Furthermore, sixth capacitor 120 is bridged by a fifth diode 128 and connected by means of a sixth diode 130 to voltage supply source 72. There is a tap between fourth diode 122 and sixth capacitor 120, a tap which is contacted by first inputs 54 of the first, second, third, fourth, and fifth OR logic switch 40, 42, 44, 46, 48 and second input 110 of the further logic switch 108.

If the overvoltage is present at the two terminals 12, 14, the electrical voltage dropping across sixth capacitor 120 exceeds a certain limit, so that the first, second, third, fourth, and fifth OR logic switches 40, 42, 44, 46, 48 are driven, which is why switching elements 28 are transferred to the electrically conductive state. In this case, the maximum electrical voltage applied at OR logic switches 40, 42, 44, 46, 48, 108 is adjusted by means of fifth and sixth diodes 128, 130. Fifth and sixth capacitors 118, 120 are discharged by means of sixth resistor 124 and seventh resistor 126. Fourth diode 122 ensures that fifth capacitor 118 can only be discharged via sixth resistor 126.

Figure 3:
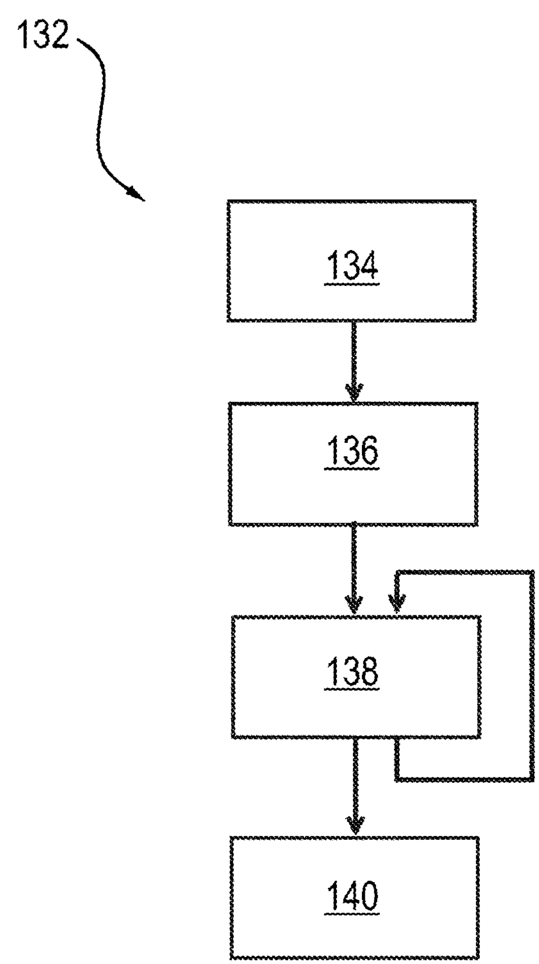
FIG. 3 shows a method for operating the overvoltage protector.

A method 132 for operating overvoltage protector 8 is shown in FIG. 3. In a first step 134, the overvoltage is detected. This is done by means of detection circuit 16, namely when the electrical voltage across sixth capacitor

120 exceeds the predetermined limit. In a second step 136, all switching elements 28 are closed, so that the voltage at which second terminal 14 is between first terminal 12 and ground 24 is reduced. In other words, a flow of current across strings 22 is possible. The closing of switching elements 28 takes place by means of the first, second, third, fourth, and fifth OR logic switches 40, 42, 44, 46, 48 as soon as the determined voltage is applied across sixth capacitor 120. Further, the electrical voltage across voltage divider 96 is increased due to the overvoltage, and this electrical voltage is applied to trigger terminal 94 of timer 18. Also, a signal is applied to shift register 20 via further OR logic switch 108, so that now start output 60 is no longer driven but rather first output 58*a*. As a result, switching elements 28 and the connection of third inputs 52 to outputs 50 of the respective preceding OR logic switch 40, 42, 44, 46, 48 remain in the closed state due to the driving of first OR logic switch 40, even if the electrical voltage, which drops above sixth capacitor 120, falls below the specified limit.

As soon as the electrical voltage applied to trigger terminal 94 of timer 18 has fallen to one third of the operating voltage, a pulse is output in a third step 138 via time output 102 and fed to further OR logic switch 68. As a result, second output 58*b* of shift register 20 is now driven and switching element 28 of first string 22*a* is opened. Thus, only four of strings 22 are still electrically conductive and the resistance of overvoltage protector 8 is increased. In particular, the period between the beginning of the second work step 136 and the start of the third work step 138 defines a specific period of time.

The third step 138 is repeated until fifth output 58*e* is driven. Following this, a fourth step 140 is executed and final output 62 of shift register 20 is driven. As a result, reset input 66 of shift register 20 is driven and start output 60 is driven again. Also, switching element 28 of fifth string 22*e* is shifted to the open state, so that timer 18 is also shifted to the original state via reset input 114. The electrical voltage remaining between first terminal 12 and second terminal 14 is reduced via further resistor 30 and capacitor 32 and resistor 26 of fifth string 22*e*. It is ensured by means of additional resistor 34 that capacitor 32 is discharged after this.

In summary, it is ensured by means of overvoltage protector 8 that relatively frequently occurring overvoltages are intercepted without wear and reliably, wherein the maximum operating time of overvoltage protector 8 is relatively high. If an electrical overvoltage occurs at device 4 to be protected, strings 22 are activated and thus switched to be electrically conductive. As a result, the overvoltage applied to device 4 to be protected is limited due to the parallel strings 22. In addition, timer 18 and shift register 20 are activated. The maximum overvoltage depends on the flowing electric current and the ohmic resistance of strings 22. Thus, a surge current can be safely diverted without device 4 to be protected being damaged. When the electric current decreases, this is detected by detection circuit 16 and timer 18 and a signal is fed to shift register 20. As a result, the resistance value of overvoltage protector 8 is increased, which results in a renewed increase in the electrical voltage between first terminal 12 and second terminal 14. The electric current decreases again after this. This process is repeated until the current is forced to zero due to the series connection of electrical resistor 26, further resistor 30, and capacitor 32. Because the electrical energy is absorbed mainly due to resistors 26 and further resistor 30, a relatively small-sized capacitor 32 is sufficient.

Due to the interconnection of detection circuit 16 with the first, second, third, fourth, and fifth OR logic switches 40, 42, 44, 46, 48, a relatively fast switching on of switching elements 28 is made possible, so that even transient overvoltages can be intercepted relatively safely. Due to the interconnection of reset input 114 of timer 18 with switching element 28 of fifth string 22*e*, it is ensured that timer 18 is only active when the overvoltage is present. In this case, voltage divider 96 is used to transmit the electrical voltage to trigger output 94 of timer 18. As soon as the electrical voltage at trigger output 94 has dropped to one third of the operating voltage, timer 18 provides a pulse to time output 102 and thus to shift register 20. In order to ensure safe passage through shift register 20 even with a weakly inductive load, a forced pulse circuit is implemented. The minimum pulse width is predetermined by third resistor 92 and by fourth capacitor 90. Discharge terminal 86 of timer 18 is a collector of a transistor internally connected to time output 102. This thus blocks when the output is high and thus has a level, and conducts when the output is low, which is why fourth capacitor 90 is charged via third resistor 92 when time output 102 is high. This takes place as long as the electrical voltage at threshold output 88 is below ⅔ of the electrical operating voltage. Because a new interval can only begin when the electrical voltage at trigger output 94 has fallen below ⅓ of the operating voltage, the time output (output) 102 is fed back to trigger output 94 via third diode 104.

Detection circuit 16 comprises fifth capacitor 118, sixth capacitor 120, fourth diode 122, and sixth and seventh resistors 124, 126. In this case, fifth and sixth capacitors 118, 120 form the capacitive voltage divider 116. The electrical voltage across sixth capacitor 120 is forwarded directly to further OR logic switch 108 as well as to the first, second, third, fourth, and fifth OR logic switches 40, 42, 44, 46, 48. As soon as this electrical voltage exceeds a certain trigger value, all strings 22 are shifted to the electrically conductive state. In order to avoid damaging the OR logic switches 40, 42, 44, 46, 48, 108, the maximum electrical voltage is limited by fifth and sixth diodes 128, 130. It is ensured by means of sixth and seventh resistor 124, 126 that fifth and sixth capacitors 118, 120 are safely discharged. In this case, it is ensured by means of fourth diode 122 that sixth capacitor 120 cannot discharge via fifth capacitor 118. This can occur only by means of seventh resistor 126, which is why an extended on-time of strings 22 is realized. As a result, it is ensured that even with relatively short applied overvoltages, overvoltage protector 8 operates as intended and in particular method 132 is executed, also if timer 18, shift register 20, and/or OR logic switches 40, 42, 44, 46, 48, 108 have a certain delay time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An overvoltage protector for protecting a device to be protected, the overvoltage protector comprising:

a first terminal;

a second terminal; and at least two strings connected in parallel to one another between the first terminal and the second terminal, each string of the at least two strings having a resistor, and at least one of the strings each comprising a switching element that is connected in series to the resistor of each string of the at least two strings, wherein the switching element of the string has a control input, wherein the control input of the switching element is connected to an output of an OR logic switch, and wherein a first input of the OR logic switch is connected to the first terminal, and wherein the first input has a level when an overvoltage is applied between the first terminal and the second terminal, wherein the first input of the OR logic switch is connected to a first input of a further OR logic switch and a time output of a timer is connected to a second input of the further OR logic switch, and wherein an output of the further OR logic switch is connected to a time input of the shift register.

* * * * *